United States Patent [19]

Schwartzkopff et al.

[11] 4,129,097
[45] Dec. 12, 1978

[54] FLOOR COVERING SHEET FOR STABLES

[75] Inventors: Udo Schwartzkopff; Horst Fischer, both of Wuppertal, Germany

[73] Assignee: Akzona Incorporated, Asheville, N.C.

[21] Appl. No.: 773,932

[22] Filed: Mar. 3, 1977

[51] Int. Cl.² .................. A01J 1/00; B32B 27/06
[52] U.S. Cl. ........................... 119/28; 428/224; 428/284; 428/286; 428/288; 428/296; 428/332
[58] Field of Search ............. 428/175, 180, 224, 284, 428/286, 288, 296, 301, 332; 119/28

[56] References Cited

U.S. PATENT DOCUMENTS

| 347,763 | 8/1886 | Baker | 428/179 |
|---|---|---|---|
| 3,196,315 | 7/1965 | Peterson | 428/95 |
| 3,266,969 | 8/1966 | Makansi | 428/92 |
| 3,282,771 | 11/1966 | Goodman et al. | 428/296 |
| 3,423,263 | 1/1969 | Pannone | 428/286 |
| 3,691,004 | 9/1972 | Werner et al. | 428/296 |
| 3,755,062 | 8/1973 | Schirmer | 428/286 |
| 4,042,740 | 8/1977 | Kreuger | 428/178 |

Primary Examiner—George F. Lesmes
Assistant Examiner—P. Thibodeau
Attorney, Agent, or Firm—Francis W. Young; Jack H. Hall; John H. Shurtleff

[57] ABSTRACT

A stable floor for animals which is in structural combination with a floor covering sheet having at least two layers: a compressible sublayer of a resilient and highly porous filamentary matting partly embedded in a top layer which is impermeable to moisture. The floor covering sheet provides good insulation and has dimensional stability so as to remain resilient over a prolonged period of time.

7 Claims, 5 Drawing Figures

FLOOR COVERING SHEET FOR STABLES

This invention relates to a floor covering sheet for stables consisting of a compressible sublayer and an impermeable top layer.

A floor covering sheet for stables of this type is described, e.g. in German Design Pat. No. 1,817,678. In this patent the top layer consists of a superficially structured, fabric-reinforced plastic material, whereas the sublayer is a foam. On the floor side, the sheet is lined with plastic film and secured in the area of the stalls with an adhesive to the cement or similar stable floor.

The floor covering sheet for stables described in German Design Pat. No. 1,864,178 has a similar structure. It, too, is glued to the stable floor.

A foamed sublayer is also part of the floor covering sheet for stables described in German Design Pat. No. 1,957,103. In this version, the top layer is composed of a rubberized or plastic-coated fabric. The sheet is preferably premanufactured and provided with plastic strips by means of which it is firmly secured to the stable floor.

In the floor covering sheet for stables described in Swiss Pat. No. 516,994 and German Design Pat. No. 7,424,846 the sublayer is also composed of a foamed plastic or a granular rubber composite, whereby an impermeable layer is provided on the floor side.

The construction and production of floor covering sheets for stables known according to the state of the art are very costly. Moreover said sheets exhibit the serious drawback that — unavoidably over the long term — the top layer, or where present, the impermeable backing of the sublayer is damaged and allows moisture to seep in and/or adhere to the fine pores of the foamed sublayer; after a relatively short time, the pores of the sublayer are filled with liquid so that one of the main objectives of such floor covering sheets for stables, namely insulation against penetrating cold is no longer met. Another drawback of known floor covering sheets for stables is their low dimensional stability. Farm animals standing or lying in the stalls cause severe compression of the foamed sublayer and the recovery of the foam structure, especially when moisture has seeped in, drops sharply. Over the long term, the floor covering loses both its insulation capacity and its resilience.

The objective was therefore to provide a floor covering sheet for stables which after prolonged use an even after damage to the impermeable top layer, would have a good insulating effect against penetrating cold. Furthermore, the floor covering sheet for stables according to the invention should have adequate dimensional stability. The sublayer should exhibit excellent resiliency and softness, but particularly a high pore component with a porous structure so open and wide that, on the one hand, no moisture, e.g. in the form of capillary moisture may seep in, and that, on the other hand, e.g. after damage to the outer face of the top layer, any moisture having seeped in is quickly dissipated by favorable ventilation of the structure.

This objective is met according to the invention, with the floor covering sheet for stables of the above-mentioned type in that the compressible sublayer is a matting composed of a plurality of filaments of a diameter of 0.4 to 2.5 mm intersecting one another and fused at their points of intersection, one of the two faces of said sublayer being partly embedded in the impermeable top layer.

The filaments of the matting sheet are preferably deposited in loops. A matting sheet of this type can e.g. be obtained by a process described in U.S. Pat. No. 3,691,004, which is incorporated herein by reference.

In another preferred embodiment, at least one outer face of the matting sheet forming the sublayer, namely the face away from the top layer, has a waffle-like structure.

The term "waffle-like" structure refers to surfaces presenting more or less evenly distributed recesses (areas devoid of filament) assuming a hemispherical, conical, truncated conical, pyramidal or truncated pyramidal shape.

The matting exhibiting such waffle-like structure outer faces can be obtained, e.g. by spinning a polymer melt onto a moving surface on which more or less evenly distributed hemispherical, conical, truncated conical, pyramidal or truncated pyramidal elements are fastened. Depending on the ratio of spinning speed to matting take-up speed, a filament layer of approximately uniform thickness, covering these elements and dropping between said elements is formed, resulting in a matting structured on both faces, or else the spaces between the elements are filled with yarn material so that a unilaterally structured matting is obtained. Details of a method for the manufacture of such matting are given in U.S. patent application Ser. No. 703,277 filed July 7, 1976, incorporated herein by reference.

To form an impermeable layer on this matting sheet, a coating of a few millimeter thickness of, e.g. soft PVC is applied, whereby the matting is partly embedded in this top layer to e.g. a depth of 1 to 5 mm for a matting thickness of 10 to 40 mm.

To increase the anti-skid characteristics, the effective area of the top layer can be structured in a known manner. Preferably, a nonwoven of synthetic filaments or fibers is applied to it. Fine denier filaments or fibers are preferred here, because in addition to anti-skid characteristics they impart a greater resiliency/softness to the surface. The nonwoven may e.g. be a card web or a spinning web, it may e.g. be bonded with an adhesive or by needle-punching. Its thickness need only be a few millimeters, e.g. 2mm. A nonwoven of this type enhances simultaneously the wear resistance of the top layer.

The filaments of the matting to be used as sublayer according to the invention are composed of synthetic polymers, preferably polycaprolactam, because of its good elasticity and high resistance to decay. These filaments, as well as the filaments or fibers of the nonwoven applied to the effective area may also consist of other fiber-forming polymers, such as polyhexamethylene adipamide, polyethylene terephthalate or copolymers thereof, or polyolefins, in particular, polypropylene.

The invention is described with the aid of the enclosed drawings, wherein.

Figure 1:
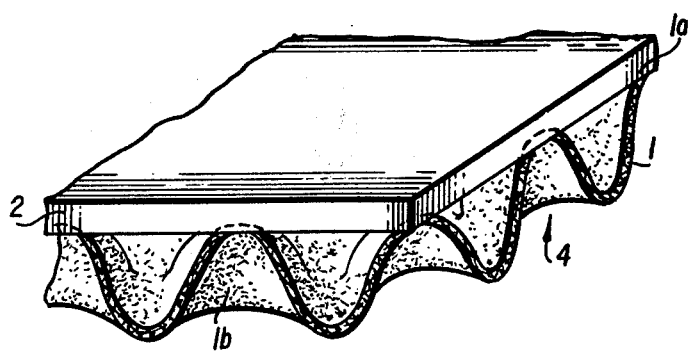
FIG. 1 illustrates a portion of a two-layered embodiment of the floor covering sheet for stables according to the invention with a matting structured on both sides as sublayer.
Figure 2:
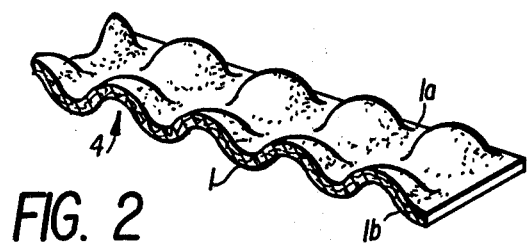
FIG. 2 illustrates a portion of the matting used in conjunction with the floor covering sheet for stables according to FIG. 1.

FIG. 1 illustrates structural principles of a two-layered floor covering sheet for stables. In this version, the compressible sublayer consists of a matting 1 of a plurality of filaments intersecting one another and fused at their points of intersection, with face 1a. or its two faces 1a. and 1b. partly embedded in impermeable top layer 2, face 1b. away from top layer 2 assuming a waffle-like structure because of recesses 4 (areas devoid of yarn) — here of hemispherical shape —. Matting sheet 1 as such is shown in FIG. 2 to illustrate the waffle-like structured bottom face 1b. Instead of the hemispherical recesses 4 shown here, bottom face 1b. may have yarn-free areas of a different shape, e.g. conical, truncated conical, pyramidal or truncated pyramidal recesses.

With the matting sheet according to FIG. 1 and FIG. 2, the areas of upper face 1a. between recesses 4 are not filled with yarn material. To obtain an especially favorable bond between matting sheet 1 used as sublayer and impermeable top layer 2, it may be expedient to fill these areas with yarn material.

Figure 3:
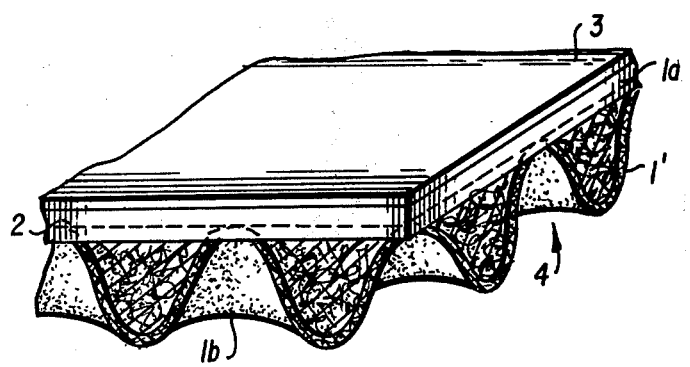
FIG. 3 illustrates a three-layered floor covering sheet for stables similar to that shown in FIG. 1 using as sublayer a unilaterally structured matting.

A preferred three-layered stable floor covering having a matting sheet 1' filled with yarn material is illustrated in FIG. 3. The upper face 1a. of this matting sheet is virtually level. Impermeable top layer 2 is substantially identical to that in FIG. 1. A non-woven layer 3 of synthetic fibers overlays said impermeable top layer.

Figure 4:
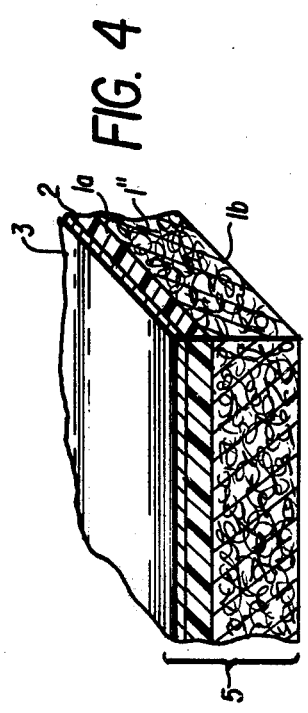
FIG. 4 illustrates a portion of another preferred embodiment of the floor covering sheet for stables according to the invention using as sublayer a matting made of looped filaments.

FIG. 4 illustrates another preferred floor covering sheet for stables 5 according to the invention. The sublayer is composed of a matting 1" of looped filaments, intersecting one another and fused at their points of intersection. Both faces 1a., 1b. of this matting 1' are level.

Figure 5:
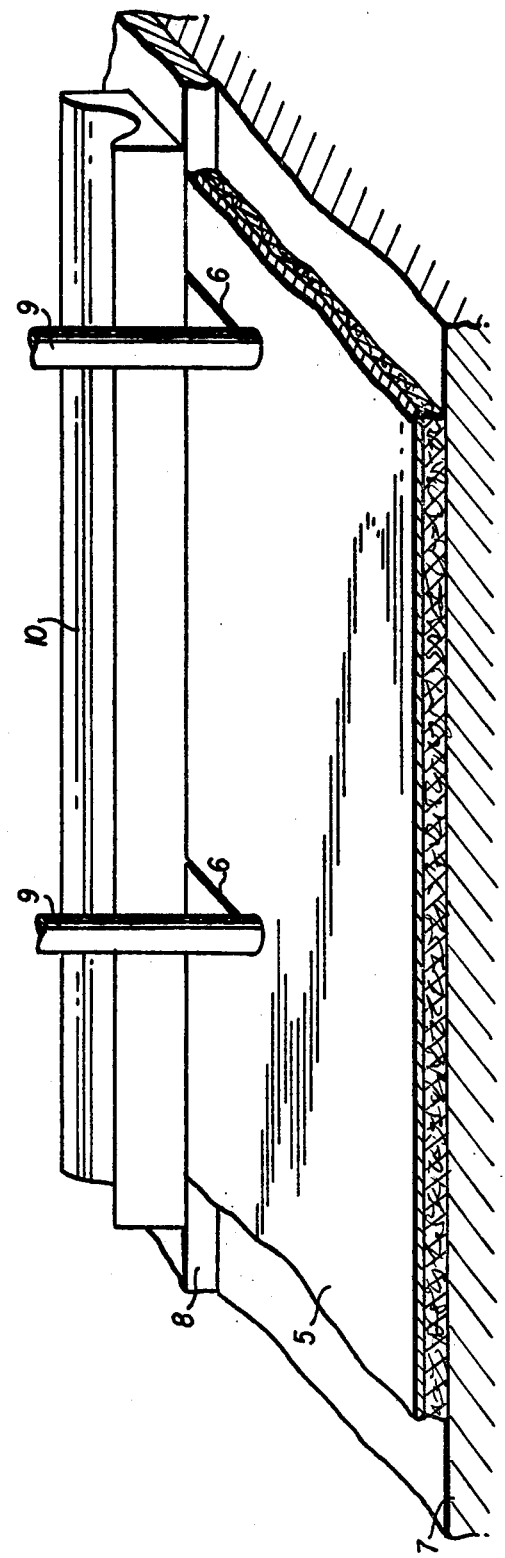
FIG. 5 illustrates a section of installed floor covering sheet for stables.

FIG. 5 illustrates the installation of such floor covering sheet 5 for stables in a stall. The stalls are partitioned off laterally by posts 9 and frontally by feed board 8 with feed crib 10 (in the case of a simple rest stall, a wall would replace these). Stable floor 7 is laid out in continuous parallel alignment with feed board 8. Where continuous installation is hampered by posts 9 or other stall partitions, the material is cut 6 at the feed board side. The floor covering sheet for stables 5 is supplied in width accomodating the stall length, e.g. 1.8 m and is rolled out in the stall. Due to the weight of top layer 2 and, where applicable, of nonwoven 3 applied on top, matting sheet 1' lies firmly on the stable floor 7. Because of the seamless installation of the floor covering sheet for stables according to the invention, farm animals standing or lying on it cannot readily displace it. It is therefore unnecessary to cement the sheet over the entire stable floor; as a rule, it is quite sufficient to fasten the sheet material at the head end of the stall either mechanically or by means of an adhesive.

The top layer 2 of the floor covering sheet for stables shown in FIGS. 3 and 4 is provided against skidding and to increase the wear-resistance with a textile nonwoven 3 that is cemented or secured to it, which nonwoven having a thickness of 1 to 3 mm may be relatively thin compared with the top layer.

Matting sheet 1, 1', 1", essential to the invention, and serving as sublayer has a very high pore component, normally exceeding by far 90 to 92%. Air is able to circulate freely, any forming condensation water is able to dry out and the growth of decay bacteria is inhibited. The structure cannot become logged with liquid and thus lose its insulation properties. On the contrary, water seeping below the top layer can readily drain off or dry out.

We claim:

1. In structural combination with a stable floor for animals, a soft and resilient floor covering sheet comprising a highly porous, compressible sublayer in placement on said floor and a polymeric top layer which is impermeable to moisture, said compressible sublayer consisting essentially of a matting sheet composed of continuous, looped synthetic polymeric filaments intersecting one another and fused at their points of intersection, said filaments having a diameter of 0.4 to 2.5 mm, said matting having in its normal non-compressed state a porosity exceeding 90% with its porous structure being sufficiently open to prevent any accumulation of capillary moisture, and the upper face of said matting being at least partly embedded in said impermeable top layer.

2. The structural combination claimed in claim 1 wherein the lower face of said matting away from the top layer has a waffle-like structure.

3. The structural combination claimed in claim 1 which includes an overlay secured onto said impermeable top layer and consisting of a nonwoven of synthetic filaments or fibers.

4. The structural combination claimed in claim 1 wherein said floor covering sheet is installed substantially without seams over the stable floor.

5. The structural combination claimed in claim 1 wherein the impermeable top layer is formed by a PVC which receives the embedded matting to a depth of about 1 to 5 mm for a matting thickness of about 10 to 40 mm.

6. The structural combination claimed in claim 1 wherein the matting filaments are composed of a synthetic, fibrous polymer selected from the group consisting of polycaprolactam, polyhexamethylene adipamide, polyethylene terephthalate and polypropylene.

7. The structural combination claimed in claim 6 wherein the matting filaments consist essentially of polycaprolactam.

* * * * *